July 5, 1938.  S. L. EGENAS  2,122,909
FLUSH TANK
Filed March 25, 1937  2 Sheets-Sheet 1
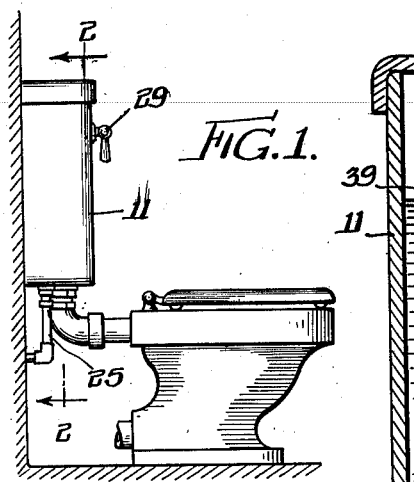
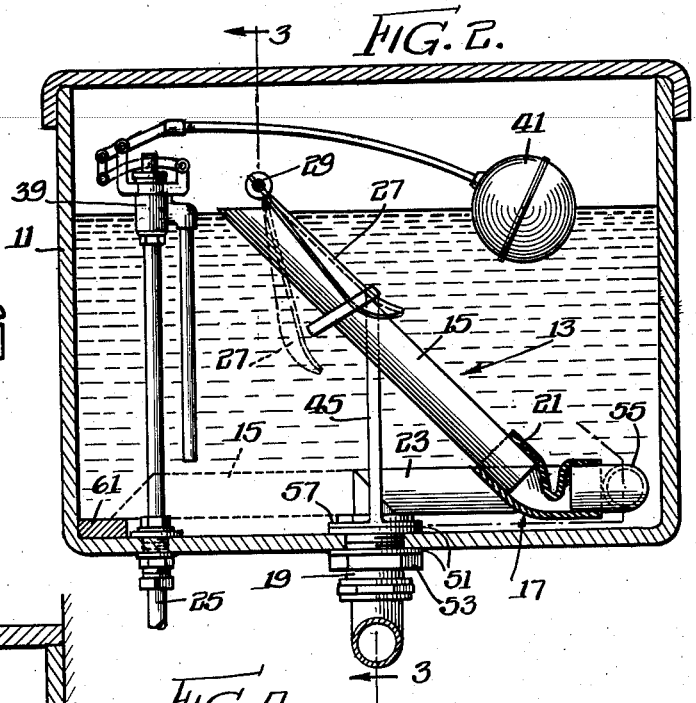
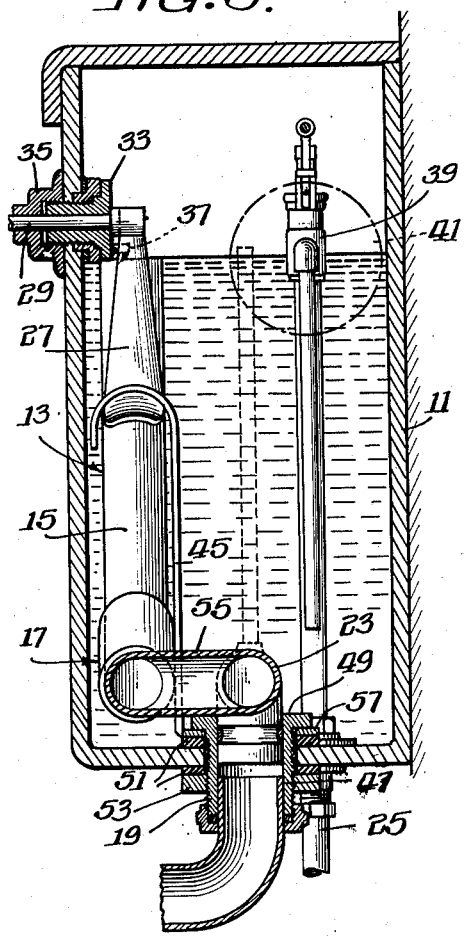
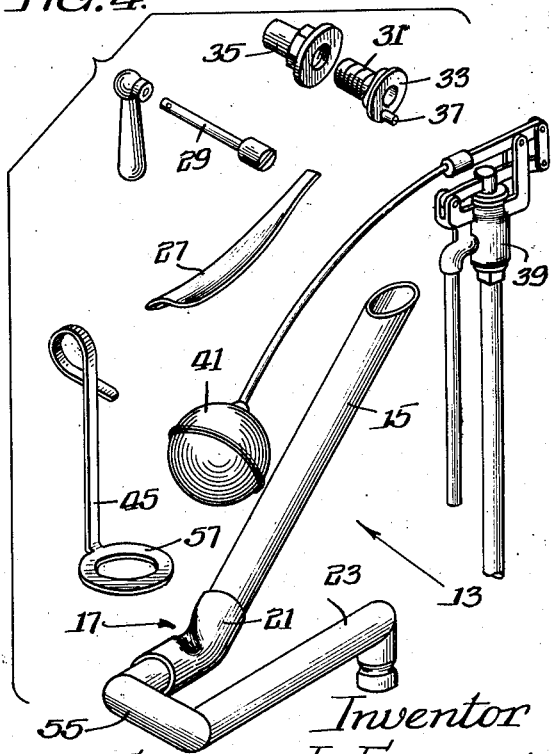
Inventor
Severin L. Egenas
By: Cox & Moore attys.

July 5, 1938. S. L. EGENAS 2,122,909
FLUSH TANK
Filed March 25, 1937 2 Sheets-Sheet 2
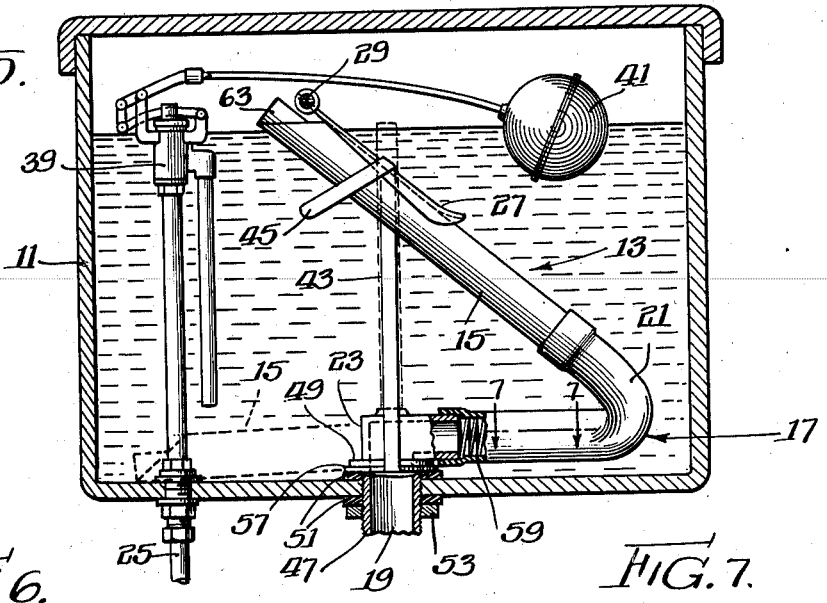
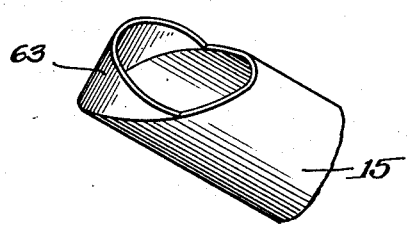
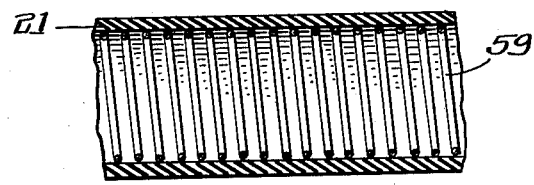
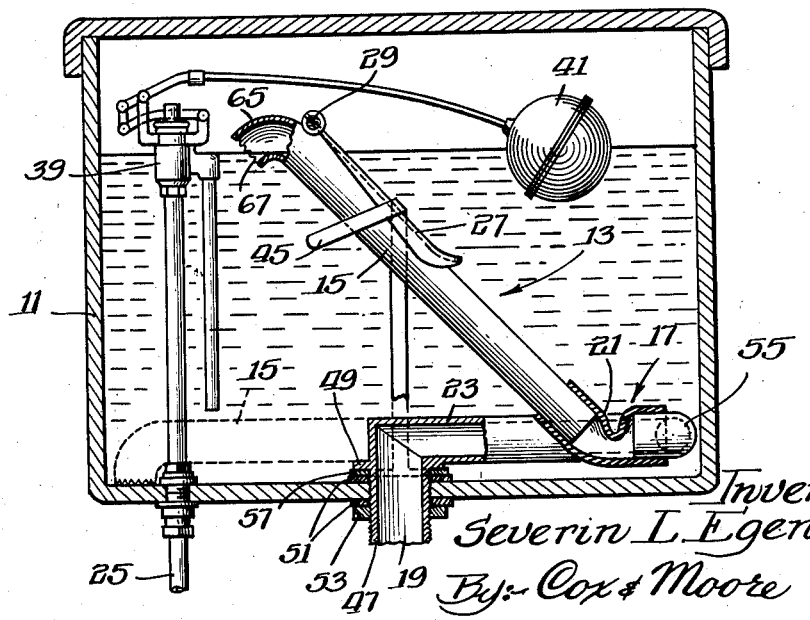
Inventor
Severin L. Egenas
By: Cox & Moore attys.

Patented July 5, 1938

2,122,909

UNITED STATES PATENT OFFICE 2,122,909

FLUSH TANK

Severin L. Egenas, Oak Park, Ill., assignor to Dr. Hermann Hille, Chicago, Ill.

Application March 25, 1937, Serial No. 133,027

7 Claims. (Cl. 4—42)

My invention relates in general to metering and has more particular reference to novel and improved means for and method of delivering measured quantities of liquid at intervals from a reservoir, the invention—in its more specific aspects—pertaining to the periodic flushing of sanitary fixtures.

An important object of the invention is to simplify flushing apparatus, for example flushing equipment used in conjunction with sanitary fixtures, by eliminating the necessity of providing a flushing valve in such apparatus.

Another object is to employ floating conduit means of simple, inexpensive character as a flushout control in a liquid reservoir.

Another object is to control liquid flow through the discharge outlet of a liquid reservoir by means of a control conduit flexibly connected with the outlet and having an open end, the conduit when empty being adapted normally to float in the liquid in the reservoir with the opening above the liquid level therein, the conduit, however, when filled up with liquid, as by depressing the opening thereof below the liquid level in the reservoir, being heavy enough to sink and remain submerged in the liquid, thus permitting the liquid in the reservoir to drain through the outlet until the conduit is empty and may again float and block exit of liquid through the outlet as the reservoir is refilled with liquid.

Another important object is to provide metering apparatus operable, at intervals, to release measured quantities of liquid from a reservoir; a further object being to render the equipment self-operating.

Among the other objects of the invention is to provide simplified and inexpensive apparatus of the character described, including the specific structure illustrated in the accompanying drawings and described in the following specification.

Numerous other objects, advantages and inherent functions of the invention and its diversified application will be understood from the following description which, taken in connection with the accompanying drawings, discloses preferred embodiments of the invention.

Referring to the drawings:

Figure 1 is an elevational view illustrating a flush tank containing a preferred embodiment of the invention;

Figure 2 is a sectional view taken substantially along the line 2—2 in Figure 1;

Figure 3 is a sectional view taken substantially along the line 3—3 in Figure 2;

Figure 4 is an exploded view showing, in perspective, the flow control elements illustrated in Figures 2 and 3;

Figures 5 and 8 are sectional views similar to Figure 2 showing modified arrangements of the parts;

Figure 6 is a perspective view illustrating a preferred form of discharge control pipe; and Figure 7 is a sectional view taken substantially along the line 7—7 in Figure 5.

To illustrate my invention, I have shown on the drawings apparatus operable at intervals to release measured quantities of liquid from a reservoir, the invention being illustrated specifically as applied in flush tanks used in conjunction with sanitary fixtures for the periodic flushing of the same, although it will be obvious that the invention is not necessarily restricted to the flushing of such fixtures.

The invention broadly comprises the combination, with means forming a reservoir 11, which in the illustrated embodiment comprises a flush tank, of control apparatus 13 operable at intervals to release definite quantities of liquid and permit the same to drain or flush out of the reservoir 11, the operable control apparatus 13 comprising a conduit 15 flexibly connected as at 17 with a discharge outlet 19, preferably located at or near the bottom of the reservoir 11. The conduit 15 may comprise a length of pipe, one end of which is connected by means of a flexible sleeve 21, preferably of rubber, with suitable conduit means 23, connected with the outlet 19 and which may conveniently extend within the reservoir 11.

The pipe 15, by virtue of the flexible connection 17, is adapted to float in the liquid contained in the reservoir, with the free end of the pipe extending above the level of the liquid. Thus when liquid is admitted to the reservoir through an inlet pipe 25, the conduit 15 will float on and in the liquid in the reservoir and will be shifted from the position illustrated in broken lines in the drawings to the position shown in solid lines, during which interval none of the liquid may escape through the outlet 19. After the reservoir is filled, the open end of the conduit 15 may be submerged beneath the level of liquid in the reservoir, thus permitting the conduit to become filled with liquid. Thereupon the conduit 15 loses its buoyancy and will immediately sink to the dotted line position shown in the drawings, forming a draining connection through which a predetermined quantity of liquid may be flushed or drained from the reservoir and discharged through the outlet 19.

The open end of the conduit 15 may be submerged in order to initiate the flushing action by any suitable, preferred or convenient means. For example, a shiftable cam-like plate or blade 27, preferably shaped like an enlarged shoe horn, may be provided within the tank and carried in position registering with and overlying the upper side of the conduit 15, when the same is in elevated position, the cam-like blade upon being moved downwardly serving to depress the conduit sufficiently to immerse its open end beneath the liquid level in the reservoir. In the illustrated embodiment the cam-like blade is carried on a shaft suitably supported on the walls of the reservoir 11 and having an end projecting through one of said walls and formed with a handle 29, manipulation of which causes the cam to move and actuate the conduit 15 as aforesaid. I prefer to journal the blade carrying shaft in cooperating fillings secured in the walls of the tank 11 and comprising a sleeve element 31 adapted to extend in an opening in the tank wall and having a flanged head 33 extending on the inner face of the tank wall, and a nut 35 adapted to threadingly engage the outwardly extending end of the sleeve 31. The flange 33 may carry a projecting stop pin 37 on its inner face in position to limit the downward movement of the blade 27 as indicated in broken lines in Figure 2.

The reservoir 11, particularly where the same is arranged as a flush tank for use in conjunction with sanitary fixtures, may be provided with the usual liquid supply fittings, including the inlet pipe 25 which may enter the reservoir tank through the bottom thereof, valve means 39 for controlling flow of liquid through the pipe 25 and into the reservoir, and a float 41 for closing the valve 39 when the liquid level in the reservoir reaches a predetermined elevation therein. I may also provide an overflow pipe 43 within the reservoir 11, as shown in dotted lines in Figure 3, said pipe having an upper end opening at a predetermined elevation in the reservoir. The opposite end of the pipe 43 may be connected with any suitable overflow discharge, although if the same is employed I prefer to connect the overflow pipe 43 in the conduit means 23 so that the overflow may be delivered through the outlet 19. It is not, however, essential to employ a separate overflow pipe 43, since the conduit 15 itself will act as an overflow, providing the amount of overflow liquid to be drained off and the flow capacity of the conduit 15 is such that the conduit 15 may not fill with overflow liquid to a point where the conduit 15 and the liquid therein become heavier than the liquid displaced by the conduit. Consequently, in place of the overflow pipe 43 I may simply apply stop means 45 to limit the upward movement of the conduit 15. When the conduit 15 reaches a position engaging the stop 45, it will be held against further upward movement, after which any increase in the elevation of the liquid level in the reservoir at a rate insufficient to destroy buoyancy of the conduit will permit the conduit 15 to operate as a drain. The conduit 15 may be made sufficiently large with respect to the capacity of the inlet pipe 25 to accommodate any overflow up to a limit determined by the size of the conduit 15 and the rate at which liquid overflowing into said conduit may be drained therefrom through the outlet 19. The conduit 15 will cease to operate as an overflow and commence to function as a flush-out device as soon as enough liquid accumulates within the conduit 15 to destroy its buoyancy.

In this connection I wish to call attention to the utility of my flush-out mechanism as a measuring device, and also its ability to function automatically at intervals to provide for the delivery of more or less accurately measured quantities of liquid. To this end I may provide means arranged to destroy the buoyancy of the conduit 15 at intervals to initiate the flushing operation. The foregoing may be accomplished by forming a hollow chamber on the conduit 15, as by mounting an auxiliary tube at the side of the conduit. This auxiliary tube may have an open end disposed adjacent the open end of the conduit and a closed end, formed with a restricted opening, adjacent the flexible connection. The conduit and auxiliary tube, when empty, will float with the open ends thereof above the liquid level in the reservoir. The auxiliary tube, however, will gradually fill with liquid which enters through the restricted opening, the size of which determines the rate at which the auxiliary tube may thus become filled. When the auxiliary tube becomes sufficiently full of liquid, the buoyancy of the floating element will be destroyed and the flushing operation started. The auxiliary tube, however, will drain through its open end into the reservoir during the flushing operation and so, when flushing is completed, both the conduit 15 and the auxiliary tube will be emptied and the floating mechanism placed in condition to float in the reservoir for a repetition of the automatic flushing cycle.

Alternately, mechanical means such as a float actuated mechanism may be employed to submerge the conduit 15 as and when the liquid level in the reservoir reaches a predetermined altitude, or the stop means 45 may be arranged at an elevation corresponding to a desired flushing point and the inlet means arranged to deliver liquid at a rate sufficient to destroy buoyance of the conduit 15.

Other arrangements of course may be employed to destroy the buoyance of the conduit whereby to cause the device to operate automatically, to flush out the tank at intervals or as often as the reservoir is filled to a predetermined altitude and it should be noted that the amount flushed from the tank, whether automatically or otherwise, is always a measured quantity determined by the elevation of the liquid level in the reservoir when the flushing operation starts and the position of the conduit 15 during discharge which determines the level of the liquid in the reservoir when the flushing operation is completed.

As an alternate arrangement for automatic operation, a float-controlled blade, similar to the blade 27, may be substituted for the stop 45, said blade, when the liquid level in the reservoir reaches a predetermined elevation, being actuated by the float control mechanism to submerge the open end of the conduit 15. Where the arrangement is used as an accurate liquid measure, I may provide a valve in the pipe 25 and means to close the same in order to prevent liquid from being delivered to the reservoir during the period of liquid discharge through the outlet 19.

The conduit means 15 may of course be arranged in any suitable or convenient fashion within the reservoir 11 and may operate in a plane vertically above the conduit 23 and the discharge outlet 19. I prefer, however, to arrange the conduit means 23 so that the conduit 15 operates in a vertical plane offset wtih respect to the axis of the discharge outlet 19. The outlet 19 may also be arranged in a lower side wall of the reservoir tank so that the conduit 15 may extend substantially throughout the tank when in its depressed or discharging position.

The means forming the discharge may of course be of any suitable form, but I prefer to employ a pipe fitting comprising an externally threaded sleeve 47 adapted to extend through an opening in the preferably bottom wall of the tank 11, the sleeve 47 having a flange 49 at its inner end adapted to overlie a gasket 51 for sealing the tank opening around the sleeve. The sleeve 47 may be held in place in the tank opening by means of an externally applied clamping nut 53 and the outwardly projecting threaded end of the sleeve provides means for the attachment of a connection for conveying the discharge liquid to a desired delivery station, such as the bowl of a toilet fixture.

The fitting 47 is a standard plumbing part such as is usually assembled in flush tanks. In ordinary ball valve constructions the fitting 47 is usually formed with an annular upstanding ridge at the edge of the flange 49, said ridge defining a ball valve seat. In applying my flushing device in an existing tank I may merely remove the ball valve mechanism and insert the end of the conduit means 23 in the existing ball valve seat with suitable packing wedged into the seat around the pipe 23, or I may remove the seat forming ridge and seal the pipe 23 in place in the fitting 47 in any convenient manner as by soldering, or by means of a resilient packing seated in a groove in the pipe 23 as shown in Figure 3.

The stop means 45 may comprise a member formed preferably of sheet metal and having an annular portion 57 adapted for reception under the flange 49 whereby the same may be clamped to the bottom of the tank, the stop element having an arm extending radially from the annular portion and adapted to be bent upwardly therefrom and curled at the upper end of said radially extending arm to provide the stop 45. In flush tanks for toilet fixtures, the mechanism comprising the valve 39 and valve controlling float 41 is usually arranged in the rearward portions of the tank 11, as shown in Figure 3, and consequently I prefer to arrange the conduit 15 for operation in a substantially vertical plane in the forward portions of the tank. It will be noted that the means forming the stop 45 forms a guide for maintaining the conduit against lateral movement rearwardly in the tank and consequently guides the discharge conduit 15 during its upward movement in the tank into position under the blade 27. This blade, of course, is fabricated of relatively light material so that the buoyancy of the floating conduit may raise the same from the dotted line position in Figure 2 as the conduit rises in the tank. Preferably, the curved stop element 45 is also arranged to receive the blade 27 when the conduit is at its maximum elevation.

The conduit means 23 may be of any suitable or preferred form, and suitably sealed upon or formed integral with the sleeve element 47. I prefer to form the conduit 23, however, of metal pipe, including elbow sections, an end of one of which is adapted to be frictionally received in the inner end of the sleeve element 47 and suitably sealed therein, as by soldering or by fitting a suitable packing within the sleeve 47 and around the end of the conduit means 23. As shown in Figures 2, 3 and 4, the conduit means 23 may extend from the fitting 47, with the remote end of the conduit rebent, as at 55, to form a conduit and adapted to receive one end of the relatively short, preferably rubber, sleeve 21, the opposite end of which is secured to the lower end of the conduit 15.

In Figures 5 and 7, however, I have shown the conduit means 23 comprising a simple elbow terminating relatively near the outlet sleeve 47. The flexible connection element 21 in this case comprises an elongated flexible sleeve, preferably of rubber, and preferably containing a spring 59 whereby the same is held in expanded condition to permit liquid to drain freely through the flexible connection 21. If desired, the spring 59 may be embedded in the walls of the sleeve 21.

The upper or open end of the discharge conduit 15 may be formed in any preferred manner and in Figure 1 I have shown said end mitered so that the edges of the conduit at its open end may lie in a plane substantially parallel with the level of the liquid in the reservoir when the same is filled. The lower end of the conduit also may be mitered in a plane normal to that in which the edges of the open end of the conduit are mitered, this in order to facilitate the folding of the flexible connection 21 as the conduit is tilted in the reservoir, particularly where the relatively short flexible coupling is used, as shown in Figure 2.

In order to insure complete draining of the conduit 15 during discharge and to insure that the same may float when liquid is initially introduced into the reservoir in filling the same, I may provide means for supporting the conduit 15 in a slightly tilted position when at the lower limits of its operating movement. This may be accomplished conveniently by placing a brick 61 or other suitable means in position on the bottom of the reservoir to engage and support the conduit in the desired draining position.

As shown in Figures 5 and 6, I may form the upper open end of the conduit 15 so that the opening thereof faces upwardly in the reservoir. In the illustrated embodiment this is accomplished by securing an element 63 upon the lower portions of the mitered edges of the conduit, thereby defining an upwardly facing opening in the end of the pipe. With such an arrangement it is ordinarily unnecessary to provide a support for the pipe when the same is in its lowermost or discharging position, since a pipe formed with an upwardly facing opening will, when in its discharging position, drain the liquid down to the level of the opening, and then upon the draining of the conduit the same will float upon the liquid remaining in the tank.

In Figure 8 the upper or open end of the conduit 15 is formed with a bent neck 65, the edges defining the conduit opening being preferably serrated, as at 67, so that the conduit 15 in its discharging position may be supported by the serrated edges defining said opening directly upon the bottom of the reservoir tank. This goose neck construction permits the conduit 15, when in its discharging position, to siphon practically all of the liquid from the tank in draining the same. At the same time, the conduit is supported in position to float in the liquid as the reservoir is filled. This goose neck construction, however, is equally adapted for automatic flushing operations and also to function as a drain as heretofore described.

It is thought that the invention and its numerous attendant advantages will be fully understood from the foregoing description and it is obvious that numerous changes may be made in the form, construction and arrangement of the parts without departing from the spirit or scope of the invention or sacrificing its attendant advantages, the form herein described being a preferred embodiment for the purpose of illustrating my invention.

Having thus described my invention, what is claimed as new and is desired to be secured by Letters Patent of the United States is as follows:

1. In a flush tank, the combination of inlet means for supplying water to said tank, outlet means for discharging water from said tank, a discharge conduit floating in the water in said tank, means connecting the lower end of the conduit to said outlet means, said last mentioned means comprising a flexible tube permitting the raising and lowering of said conduit, and means for causing the water in the tank to flow into said conduit whereby said conduit is depressed by the weight of the water therein to flush said tank.

2. In a flush tank the combination of inlet means for supplying water to said tank, outlet means for discharging water from said tank, a discharge pipe floating in the water in said tank, means connecting the lower end of the pipe to said outlet means, said connecting means comprising a flexible tube permitting the raising and lowering of said pipe, means to initially depress said pipe to fill the same with water, the weight of the water in said pipe carrying said pipe to the bottom of the tank and said pipe in its lowermost position permitting substantially all the water in the tank to flow out of the tank through said pipe.

3. In a flush tank, the combination of inlet means for supplying water to said tank, outlet means for discharging water from said tank, a discharge pipe floating in the water in said tank, means connecting the lower end of the pipe to said outlet, said means comprising a flexible tube permitting the raising and lowering of said pipe, a lever pivoted on said tank and overlying a portion of said pipe when the latter is in its uppermost position, and manually operable means for operating said lever to initially depress said pipe and allow water in the tank to enter into said pipe, the weight of the water in said pipe then depressing said pipe to a position substantially at the bottom of the tank whereby to permit the water in the tank to flow by gravity to the outlet through said pipe.

4. In a flush tank, the combination of inlet means for supplying water to said tank, outlet means for discharging water from said tank, a straight section of pipe floating in the water in said tank, said pipe being open at its upper end and extending upwardly above the normal level of the water in the tank, means connecting the lower end of the pipe to said outlet means, said means comprising a flexible tube permitting the raising and lowering of said pipe, means for causing the water in the tank to flow into said pipe whereby said pipe is depressed by the weight of the water therein to flush said tank.

5. In a flush tank, the combination of inlet means for supplying water to said tank, outlet means for discharging water from said tank, a straight section of pipe floating in the water in said tank, said pipe being open at its upper end and extending upwardly above the normal level of the water in the tank, means connecting the lower end of the pipe to said outlet means, said connecting means comprising a flexible tube permitting the raising and lowering of said pipe, means to initially depress said pipe to fill the same with water, the weight of the water in said pipe carrying said pipe to the bottom of the tank and said pipe in its lowermost position permitting substantially all the water in the tank to flow out of the tank through said pipe.

6. In a flush tank the combination of inlet means for supplying water to said tank, outlet means for discharging water from said tank, a straight section of pipe floating in the water in said tank, said pipe being open at its upper end and extending upwardly above the normal level of the water in the tank, means connecting the lower end of the pipe to said outlet, said means comprising a flexible tube permitting the raising and lowering of said pipe, a lever pivoted on said tank and overlying a portion of said pipe when the latter is in its uppermost position, and manually operable means for operating said lever to initially depress said pipe and allow water in the tank to enter into said pipe, the weight of the water in said pipe then depressing said pipe to a position substantially at the bottom of the tank whereby to permit the water in the tank to flow by gravity to the outlet through said pipe.

7. In a flush tank, the combination of inlet means for supplying water to said tank, outlet means for discharging water from said tank, a discharge conduit floating in the water in said tank, means connecting the lower end of the conduit to said outlet means, said means comprising a flexible tube permitting the raising and lowering of said conduit, means for causing the water in the tank to flow into said conduit whereby said conduit is depressed by the weight of the water therein to flush said tank, and means to guide said conduit and to limit the upward movement thereof.

SEVERIN L. EGENAS.